US012259721B2

(12) United States Patent
Shao et al.

(10) Patent No.: US 12,259,721 B2
(45) Date of Patent: Mar. 25, 2025

(54) INDUSTRIAL INTERNET OF THINGS FOR INTELLIGENT CONTROL OF FILLING PRODUCTION, CONTROL METHODS AND MEDIA THEREOF

(71) Applicant: CHENGDU QINCHUAN IOT TECHNOLOGY CO., LTD., Sichuan (CN)

(72) Inventors: Zehua Shao, Chengdu (CN); Bin Liu, Chengdu (CN); Yong Li, Chengdu (CN); Xiaojun Wei, Chengdu (CN); Yuefei Wu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 219 days.

(21) Appl. No.: 18/306,213

(22) Filed: Apr. 24, 2023

(65) Prior Publication Data
US 2023/0259114 A1    Aug. 17, 2023

Related U.S. Application Data

(63) Continuation of application No. 17/817,985, filed on Aug. 6, 2022, now Pat. No. 11,681,283.

(30) Foreign Application Priority Data

May 17, 2022   (CN) .......................... 202210531701.2

(51) Int. Cl.
G05B 23/02    (2006.01)
(52) U.S. Cl.
CPC ....... *G05B 23/0264* (2013.01); *G05B 23/024* (2013.01); *G05B 23/0243* (2013.01)

(58) Field of Classification Search
CPC .............. G05B 23/0264; G05B 23/024; G05B 23/0243; G05B 2219/32204; G05B 19/41875; Y02P 90/02
See application file for complete search history.

(56) References Cited

U.S. PATENT DOCUMENTS 11,994,844 B2 *  5/2024  Shao ................. G05B 19/4185
2008/0128642 A1  6/2008  Mos et al.
(Continued)

FOREIGN PATENT DOCUMENTS

CN    101462157 A    6/2009
CN    103530467 A    1/2014
(Continued)

OTHER PUBLICATIONS

First Office Action in Chinese Application No. 202210531701.2 mailed on Jun. 28, 2022, 30 pages.
(Continued)

*Primary Examiner* — Mi'Schita' Henson
(74) *Attorney, Agent, or Firm* — METIS IP LLC

(57) ABSTRACT

The present disclosure discloses an industrial Internet of Things for intelligent control of filling production, including a user platform, a service platform, a management platform, a sensor network platform, and an object platform interacting in sequence, wherein the service platform is provided with a plurality of independent service sub-platforms; the management platform is provided with a general management platform and a plurality of independent management sub-platforms, the management sub-platforms interacting with the general management platform, and the management sub-platforms interacting with the corresponding service sub-platforms; and the sensor network platform is provided with a general sensor network platform and a plurality of independent sensor network sub-platforms, the sensor network sub-platforms interacting with the general sensor net- (Continued)

work platform, and the general sensor network platform interacting with the general management platform. The present disclosure determines the target production device through processing a relationship diagram using a fault prediction model, the relationship diagram indicating a relationship between the devices corresponding to the production processes of the mixed filling production line, which can effectively reduce the complexity of the detection device, reduce defect detection costs, and improve the yield rate.

20 Claims, 5 Drawing Sheets

(56) References Cited

U.S. PATENT DOCUMENTS

| | | | |
|---|---|---|---|
| 2008/0294281 A1 | 11/2008 | Shimshi et al. | |
| 2020/0150628 A1 | 5/2020 | Vance et al. | |

FOREIGN PATENT DOCUMENTS

| | | | | |
|---|---|---|---|---|
| CN | 104867840 A | 8/2015 | | |
| CN | 105353702 A | 2/2016 | | |
| CN | 105404735 A | 3/2016 | | |
| CN | 107292885 A | 10/2017 | | |
| CN | 107659636 A | 2/2018 | | |
| CN | 107809457 A | 3/2018 | | |
| CN | 107835209 A | 3/2018 | | |
| CN | 107835222 A | 3/2018 | | |
| CN | 107862623 A | 3/2018 | | |
| CN | 107910251 A | 4/2018 | | |
| CN | 109580656 A | 4/2019 | | |
| CN | 110489257 A | 11/2019 | | |
| CN | 110816938 A | 2/2020 | | |
| CN | 110942450 A | 3/2020 | | |
| CN | 111192262 A | 5/2020 | | |
| CN | 111461555 A | 7/2020 | | |
| CN | 112015153 A | * 12/2020 | | G05B 19/41875 |
| CN | 112343576 A | 2/2021 | | |
| CN | 112950071 A | 6/2021 | | |
| CN | 113065046 A | 7/2021 | | |
| CN | 113112497 A | 7/2021 | | |
| CN | 113139734 A | 7/2021 | | |
| CN | 113141545 A | 7/2021 | | |
| CN | 113259483 A | 8/2021 | | |
| CN | 113395300 A | 9/2021 | | |
| CN | 113411359 A | 9/2021 | | |
| CN | 113411361 A | 9/2021 | | |
| CN | 113570475 A | 10/2021 | | |
| CN | 113935981 A | 1/2022 | | |
| CN | 113965591 A | 1/2022 | | |
| CN | 114083770 A | 2/2022 | | |
| CN | 114088154 A | 2/2022 | | |
| CN | 114113152 A | 3/2022 | | |
| CN | 114390079 A | 4/2022 | | |
| CN | 114399336 A | 4/2022 | | |
| CN | 114444986 A | 5/2022 | | |
| CN | 114449023 A | 5/2022 | | |
| CN | 114488988 A | 5/2022 | | |
| EP | 3561746 | 10/2019 | | |
| JP | 2008147654 A | 6/2008 | | |
| JP | 2018120347 A | 8/2018 | | |
| WO | 03058506 A1 | 7/2003 | | |
| WO | 2018191698 A1 | 10/2018 | | |
| WO | 2019013828 A1 | 1/2019 | | |
| WO | 2019211846 | 11/2019 | | |
| WO | 2021050806 A1 | 3/2021 | | |

OTHER PUBLICATIONS

Notification to Grant Patent Right for Invention in Chinese Application No. 202210531701.2 mailed on Jul. 25, 2022, 5 pages.
Remah Alshinina et al., Performance and Challenges of Service-Oriented Architecture for Wireless Sensor Networks, Sensors, 17(3): 1-39, 2017.

* cited by examiner

INDUSTRIAL INTERNET OF THINGS FOR INTELLIGENT CONTROL OF FILLING PRODUCTION, CONTROL METHODS AND MEDIA THEREOF

CROSS-REFERENCE TO RELATED APPLICATIONS

This application is a continuation of U.S. application Ser. No. 17/817,985, filed on Aug. 6, 2022, which claims priority to Chinese Patent Application No. 202210531701.2, filed on May 17, 2022, the contents of which are hereby incorporated by reference to its entirety.

TECHNICAL FIELD

The present disclosure relates to the field of intelligent manufacturing technology, and in particular, to industrial Internet of Things for intelligent control of filling production, control methods and media thereof.

BACKGROUND

Intelligent manufacturing technology is currently the frontier research aspect of industrial manufacturing. Intelligent manufacturing technology is highly dependent on the Internet of Things to implement intelligent solutions. In existing technologies, intelligent manufacturing technology needs to detect products on the production line through a series of means such as machine vision and ultrasonic defect detection, and adjust the production line-related parameters in time according to the detection results, thereby increasing the yield of producing products. However, as the scale of the production line increases, detection of products from each single production device greatly increases the pressure on data processing and data management, which is not conducive to expanding production.

SUMMARY

In order to overcome the above-mentioned deficiencies in the existing technologies, the purpose of the present disclosure is to provide an industrial Internet of Things for intelligent control of filling production and control methods.

In the first aspect, the embodiments of the present disclosure provide an industrial Internet of Things for intelligent control of filling production, comprising a user platform, a service platform, a management platform, a sensor network platform, and an object platform interacting in sequence, wherein the service platform is provided with a plurality of independent service sub-platforms; the management platform is provided with a general management platform and a plurality of independent management sub-platforms, the management sub-platforms interacting with the general management platform, and the management sub-platforms interacting with the corresponding service sub-platforms; the sensor network platform is provided with a general sensor network platform and a plurality of independent sensor network sub-platforms, the sensor network sub-platforms interacting with the general sensor network platform; wherein the plurality of sensor network sub-platforms are configured to receive defect data of products detected by different defect detection devices in the object platform; the general sensor network platform is configured to summarize all the defect data and send the defect data to the general management platform uniformly; the general management platform is configured to revise production parameters of a target production device in the object platform according to the plurality of defect data, and send the revised production parameters and the corresponding defect data as reference data to the target production device and the management sub-platform corresponding to the target production device; wherein the target production device comes from a continuous production line, the continuous production line is a mixed filling production line, and determining the target production device includes: determining a relationship diagram based on a production process of the mixed filling production line and devices related to the production process, wherein the relationship diagram indicates a relationship between the devices corresponding to the production processes of the mixed filling production line; and determining the target production device by processing the relationship diagram based on a fault prediction model, the fault prediction model including a graph neural network model; the management sub-platform store the reference data and send the reference data to the user platform through the corresponding service sub-platform; and the user platform is configured to display the reference data to a user.

When this embodiment is implemented, the inventor found in scientific practice that in existing technology, the detection technology of the good product situation of products based on defect detection has been mature. However, with the expansion of the production line, it is generally difficult to directly detect the output result of each device on the production line. Generally, the product detection is performed at the end of a production process or a small section of the production line, thereby reducing the complexity of the data, which causes that if there is a defect in the products, it is difficult to determine which device directly causes it, and is not conducive to the direct adjustment of the device parameters. The direct purpose of the embodiments of the present disclosure is that the parameters of each device can be adjusted to improve the product yield without performing defect detection on each device.

When the embodiments of the present disclosure are implemented, the five-platform structure designed before by the inventor is used to implement the embodiments and no more repeat here. The plurality of sensor network sub-platforms receive defect data of products detected by different defect detection devices in the object platform respectively, which can help the unity of the communication protocols between different defect detection devices. For example, the general sensor network platform may be configured with an interface that directly communicates with the general management platform, and interfaces corresponding to different communication protocols to dock sensor network sub-platforms. The sensor network sub-platforms may be configured to access the defect detection devices corresponding to the communication protocols in the general sensor network platform to implement the unified transformation of the communication protocols.

In the embodiments of the present disclosure, the general management platform may be configured to obtain a contribution degree of a target production device in defect by uniformly calculating the received defect data, and may perform the amendment of the production parameters of the target production device. It should be understood that the defect data in the present disclosure is not necessarily the product data that does not meet the standards. For example, the error tolerance stipulated in a product shell is ±5 mm, and the error of a product shell is 3 mm. At this time, although the shell is a good product, it may also upload 3 mm as defect data.

At the same time, in the embodiments of the present disclosure, different reference data may be sent to the management sub-platform and the production device at the same time, which can not only complete the parameter revision of the production device, but also complete the timely display of the reference data. In the embodiments of the present disclosure, different management sub-platforms correspond to different service sub-platforms for independent data transmission, which is conducive to the direct transmission of the data corresponding to the target production device and can reduce the data complexity. In the embodiments of the present disclosure, adjusting and revising the parameters of each production device without performing defect detection on each production device, which can effectively reduce the complexity of the detection device and the cost of defect detection, and increase the product yield.

In a possible implementation, the general management platform may be configured with a defect analysis model and a defect revising model. The general management platform may be configured to input the defect data into the defect analysis model and receive analysis data outputted by the defect analysis model. The general management platform may be configured to input the analysis data into the defect revising model, and determine the revised production parameters based on data outputted by the defect revising model.

In a possible implementation, the defect revising model may be a neural network model, the input of the defect revising model may include the defect data, preset candidate production parameters corresponding to each target production device, and the output of the defect revising model may include prediction defects corresponding to the candidate production parameters. The general management platform may be configured to determine candidate production parameters that the predicted defects meet preset conditions as the revised production parameters.

In a possible implementation, the relationship diagram may include at least one node and at least one edge, the devices may include a disinfection device, a peeling and cleaning device, a segmentation device, a filling device, a sterilization device, and a cooling device; wherein the at least one node of the relationship diagram may correspond to the devices related to the production process respectively, and the at least one node may include a disinfection device node, a peeling and cleaning device node, a segmentation device node, a filling device node, a sterilization device node, and a cooling device node. The at least one edge of the relationship diagram may be a directed edge, the direction of the directed edge may include pointing the disinfection device node to the peeling and cleaning device node, pointing the peeling and cleaning device node to the segmentation device node, pointing the segmentation device node to the filling device node, pointing the filling device node to the sterilization device node, and pointing the sterilization device node to the cooling device node.

In a possible implementation, features of the at least one node may include the production parameters and/or monitoring data of each device.

In a possible implementation, the fault prediction model may include a feature extraction layer, the feature extraction layer is used to process image data of each node to obtain an image feature, and the image data is obtained by an image acquisition device. The general management platform may be configured to determine the image feature as one of the features of the node.

In a possible implementation, the defect analysis model may be configured with first data and second data. The first data is benchmark data corresponding to the defect data. The second data is a contribution degree of the production parameters of each production device corresponding to the defect data. The general management platform may be configured that when the defect data is input into the defect analysis model, the defect analysis model generates differential data by comparing the defect data and the corresponding first data and calculates the contribution degree of the production parameters of each production device of all the differential data as the analysis data based on the second data.

In a possible implementation, the defect analysis model may obtain the contribution degree of the production parameters of each production device of all the differential data based on the second data when calculating the analysis data.

The defect analysis model may generate the analysis data by performing normalized superposition on the contribution degree corresponding to the same production parameters of the differential data.

In a possible implementation, the defect revising model may be configured with fourth data. The fourth data is a corresponding relationship between the analysis data and the revising range of the production parameters. The general management platform is configured that when the analysis data is input into the defect revising model, the defect revising model generates the revised production parameters based on the analysis data and the corresponding fourth data.

In the second aspect, the embodiments of the present disclosure provide a control method for an industrial Internet of Things for intelligent control of filling production, which is applied to a user platform, a service platform, a management platform, a sensor network platform, and an object platform interacting in sequence, wherein the service platform is provided with a plurality of independent service sub-platforms. The management platform is provided with a general management platform and a plurality of independent management sub-platforms, the management sub-platforms interacting with the general management platform, and the management sub-platforms interacting with the corresponding service sub-platforms. The sensor network platform is provided with a general sensor network platform and a plurality of independent sensor network sub-platforms, the sensor network sub-platforms interacting with the general sensor network platform. The control method includes receiving, by the plurality of sensor network sub-platforms, defect data of products detected by different defect detection devices in the object platform respectively; summarizing all the defect data and sending the defect data to the general management platform uniformly by the general sensor network platform; revising production parameters of a target production device in the object platform according to the plurality of defect data, and sending the revised production parameters and the corresponding defect data as reference data to the target production device and the management sub-platform corresponding to the target production device by the general management platform, wherein the target production device comes from a continuous production line, the continuous production line is a mixed filling production line, and determining the target production device includes: determining a relationship diagram based on a production process of the mixed filling production line and devices related to the production process, wherein the relationship diagram indicates a relationship between the devices corresponding to the production processes of the mixed filling production line; and determining the target production device by processing the relationship diagram based on a fault prediction model, the fault prediction model including a graph neural network model; storing the reference data and sending the reference data to the user platform through the corresponding service sub-platform by the management sub-platform; and displaying the reference data to a user by the user platform.

In a possible implementation, the general management platform may be configured with a defect analysis model and a defect revising model; the general management platform may be configured to input the defect data into the defect analysis model and receive analysis data outputted by the defect analysis model; and the general management platform may be configured to input the analysis data into the defect revising model and determine the revised production parameters based on data outputted by the defect revising model.

In a possible implementation, the defect revising model may be a neural network model, the input of the defect revising model may include the defect data, preset candidate production parameters corresponding to each target production device, and the output of the defect revising model may include prediction defects corresponding to the candidate production parameters. The general management platform may be configured to determine the candidate production parameters that the predicted defects meet preset conditions as the revised production parameters.

In a possible implementation, the input of the defect revising model may also include a credibility degree of each target production device with a fault.

In a possible implementation, the relationship diagram may include at least one node and at least one edge, the devices may include a disinfection device, a peeling and cleaning device, a segmentation device, a filling device, a sterilization device, and a cooling device; wherein the at least one node of the relationship diagram may correspond to the devices related to the production process respectively, and the at least one node may include a disinfection device node, a peeling and cleaning device node, a segmentation device node, a filling device node, a sterilization device node, and a cooling device node. The at least one edge of the relationship diagram may be a directed edge, the direction of the directed edge may include pointing the disinfection device node to the peeling and cleaning device node, pointing the peeling and cleaning device node to the segmentation device node, pointing the segmentation device node to the filling device node, pointing the filling device node to the sterilization device node, and pointing the sterilization device node to the cooling device node.

In a possible implementation, features of the at least one node may include the production parameters and/or monitoring data of each device.

In a possible implementation, the fault prediction model may include a feature extraction layer, the feature extraction layer is used to process image data of each node to obtain an image feature, and the image data is obtained by an image acquisition device. The general management platform may be configured to determine the image feature as one of the features of the node.

In a possible implementation, the defect analysis model may be configured with first data and second data. The first data is benchmark data corresponding to the defect data. The second data is a contribution degree of the production parameters of each production device corresponding to the defect data. The general management platform may be configured that when the defect data is input into the defect analysis model, the defect analysis model generates differential data by comparing the defect data and the corresponding first data and calculates the contribution degree of the production parameters of each production device of all the differential data as the analysis data based on the second data.

In a possible implementation, the defect analysis model may obtain the contribution degree of the production parameters of each production device of all the differential data based on the second data when calculating the analysis data.

The defect analysis model may generate the analysis data by performing normalized superposition on the contribution degree corresponding to the same production parameters of the differential data.

In a possible implementation, the defect revising model may be configured with fourth data. The fourth data is a corresponding relationship between the analysis data and the revising range of the production parameters. The general management platform is configured that when the analysis data is input into the defect revising model, the defect revising model generates the revised production parameters based on the analysis data and the corresponding fourth data.

In the third aspect, the embodiments of the present disclosure provide a non-transitory computer-readable medium, comprising at least one set of instructions, wherein when executed by one or more processors of a computing device, the at least one set of instructions direct the computing device to perform the control method for an industrial Internet of Things for intelligent control of filling production.

Compared with the existing technology, the present disclosure has the following advantages and beneficial effects: the parameters of each production device can be adjusted and revised without performing defect detection on each production device according to the Industrial Internet of Things for intelligent control of filling production and control methods of the present disclosure, which can effectively reduce the complexity of detecting devices, reduce the cost of defect detection, and increase the product yield.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which the same reference numerals represent the same structures, and wherein.

DETAILED DESCRIPTION

Figure 1:
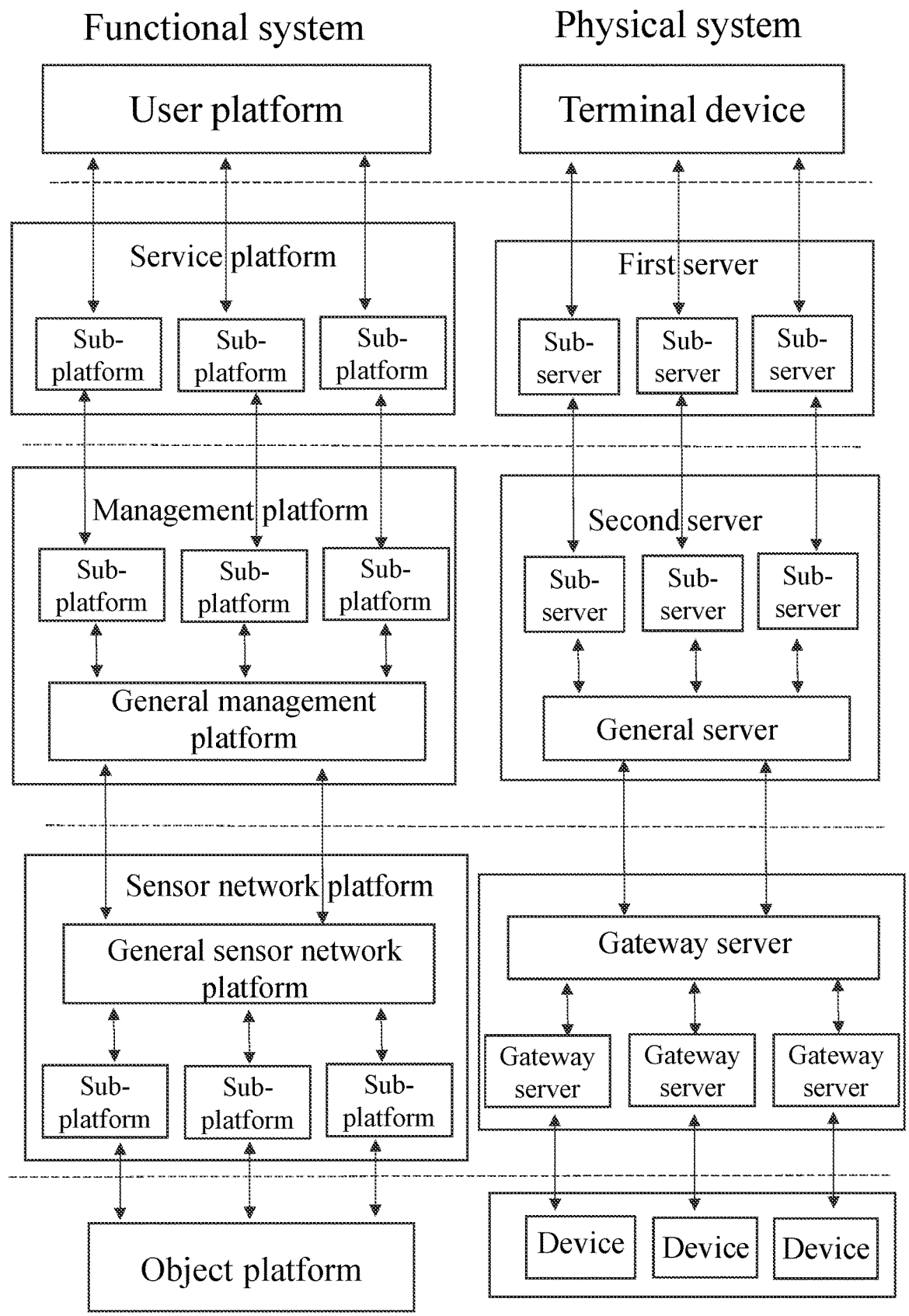
FIG. 1 is a schematic diagram of the communication architecture of the intelligent manufacturing industrial Internet of Things based on distributed control according to some embodiments of the present disclosure.

In order to more clearly illustrate the technical solutions of the embodiments of the present disclosure, the following will briefly introduce the drawings that need to be used in the description of the embodiments. Obviously, the drawings in the following description are only some examples or embodiments of the present disclosure, and those skilled in the art may apply this present disclosure to other similar situations based on these drawings and on the premise of not paying creative labor. Unless obviously obtained from the context or the context illustrates otherwise, the same numeral in the drawings refers to the same structure or operation.

It should be understood that "systems", "devices", "units", and/or "modules" used herein are one method for distinguishing different components, elements, components, parts, or assemblies of different levels. However, if other words may achieve the same purpose, the words may be replaced by other expressions.

As shown in the present disclosure and the claims, unless the context clearly suggests exceptional circumstances, the words "a", "an" and/or "the" do not specifically refer to the singular form, but may also include the plural form, the words in the plural form also include the singular form meaning. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to some embodiments of the present disclosure. It should be understood that the previous or back operations may not be accurately implemented in order. Conversely, the operations may be implemented in an inverted order, or simultaneously. At the same time, other operations may also be added to these processes, or a certain step or several steps may be removed from these processes.

FIG. 1 is a schematic diagram of the communication architecture of the intelligent manufacturing industrial Internet of Things based on distributed control according to some embodiments of the present disclosure.

The intelligent manufacturing industrial Internet of Things based on distributed control may include a user platform, a service platform, a management platform, a sensor network platform, and an object platform interacting in sequence.

In the embodiments of the present disclosure, the user platform is configured as a terminal device and interacts with a user. The service platform is configured as a first server, extracts and processes the information needed by the user platform from the management platform, and sends the information to the user platform. The management platform is configured as a second server, controls the operation of the object platform and receives the feedback data of the object platform. The sensor network platform is configured as a communication network and a gateway used for the interaction between the object platform and management platform interaction. The object platform is configured as a production line device and a production line sensor that performs manufacturing.

The service platform is provided with a plurality of independent service sub-platforms. The management platform is provided with a general management platform and a plurality of independent management sub-platforms, the management sub-platforms interacting with the general management platform, and the management sub-platforms interacting with the corresponding service sub-platforms. The sensor network platform is provided with a general sensor network platform and a plurality of independent sensor network sub-platforms, the sensor network sub-platforms interacting with the general sensor network platform. The plurality of sensor network sub-platforms receive defect data of products detected by different defect detection devices in the object platform respectively. The general sensor network platform summarizes all the defect data and sends them to the general management platform uniformly. The general management platform revises the production parameters of a target production device in the object platform according to the plurality of defect data, and sends the revised production parameters and the corresponding defect data as reference data to the target production device and the management sub-platform corresponding to the target production device. The management sub-platform stores the reference data and sends the reference data to the user platform through the corresponding service sub-platform. The user platform displays the reference data to a user.

When this embodiment is implemented, the inventor found in scientific practice that in existing technology, the detection technology of the good product situation of products based on defect detection has been mature. However, with the expansion of the production line, it is generally difficult to directly detect the output result of each device on the production line. Generally, the product detection is performed at the end of a production process or a small section of the production line, thereby reducing the complexity of the data, which causes that if there is a defect in the products, it is difficult to determine which device directly causes it, and is not conducive to the direct adjustment of the device parameters. The direct purpose of the embodiments of the present disclosure is that the parameters of each device can be adjusted to improve the product yield without performing defect detection on each device.

When the embodiments of the present disclosure are implemented, the five-platform structure designed before by the inventor is used to implement the embodiments and no more repeat here. The plurality of sensor network sub-platforms receive defect data of products detected by different defect detection devices in the object platform respectively, which can help the unity of the communication protocols between different defect detection devices. For example, the general sensor network platform may be configured with an interface that directly communicates with the general management platform, and interfaces corresponding to different communication protocols to dock sensor network sub-platforms. The sensor network sub-platforms may access the defect detection devices corresponding to the communication protocols in the general sensor network platform to implement the unified transformation of the communication protocols.

In the embodiments of the present disclosure, the general management platform may obtain a contribution degree of a target production device in defect by uniformly calculating the received defect data, and may perform the amendment of the production parameters of the target production device. It should be understood that the defect data in the present disclosure is not necessarily the product data that does not meet the standards. For example, the error tolerance stipulated in a product shell is ±5 mm, and the error of a product shell is 3 mm. At this time, although the shell is a good product, it may also upload 3 mm as defect data.

At the same time, in the embodiments of the present disclosure, different reference data may be sent to the management sub-platforms and the production devices at the same time, which can not only complete the parameter revision of the production device, but also complete the timely display of the reference data. In the embodiments of the present disclosure, different management sub-platforms correspond to different service sub-platforms for independent data transmission, which is conducive to the direct transmission of the data corresponding to the target production device and can reduce the data complexity. In the embodiments of the present disclosure, adjusting and revising the parameters of each production device without performing defect detection on each production device, which can effectively reduce the complexity of the detection device and the cost of defect detection, and increase the product yield.

In a possible implementation, the general management platform may be configured with a defect analysis model and a defect revising model. The general management platform may input the defect data into the defect analysis model and receive analysis data outputted by the defect analysis model. The general management platform may input the analysis data into the defect revising model and determine the revised production parameters based on data outputted by the defect revising model.

When the embodiments of the present disclosure are implemented, the defect analysis model may perform defect analysis, and the defect revising model may perform defect revision. The role of the defect analysis model is to uniformly analyze all defect data to determine the contents needed to be revised for each production device in each defect data, and the role of the defect revising model is to revise generated parameters based on the analysis data. For example, the defect analysis model and the defect revising model may be set according to the complexity of the production line. If the production line is complicated, it may use a training method of a neural network model to train the defect analysis model and the defect revising model. And if the production line is simple, ordinary machine learning or other relatively simple methods may be used for model generation. For example, the overall production line is a production line of the gas meter. Since the production line of general gas meters is segmentation production, the tail of each segmentation may be provided with a defect detection device, and the influence between different segmentations is small. At this time, the preset simple model may be used for data analysis and the adjustment of the generated device parameters. Specifically, there is a 2 mm*3 mm burr in the defect detection of the shell of the gas meter, among them, 2 mm is the size of the burr in the X direction, and 3 mm is the size of the burr in the Y direction. At this time, it may analyze the reason for the error is that there is a 2 mm error in the X direction during the stamping process, and there is a 3 mm error in the Y direction of a grinding device during the process of removing a burr. The analysis process may be realized through the image collection or other technologies of the defect detection device. Because the existential form of the burr during the stamping process and the grinding process is different, which can achieve an accurate analysis of the burr itself. By analysis, the parameters of different devices may be adjusted to avoid further increasing the impact of the product yield. It should be understood that in the embodiments of the present disclosure, the adjustment of the parameters is dynamic, so a dynamic error balance may be formed to ensure the yield.

In a possible implementation, the defect analysis model may be configured with first data and second data. The first data is benchmark data corresponding to the defect data. The second data is a contribution degree of the production parameters of each production device corresponding to the defect data. When the general management platform inputs the defect data into the defect analysis model, the defect analysis model may generate differential data by comparing the defect data and the corresponding first data and calculate the contribution degree of the production parameters of each production device of all the differential data as the analysis data based on the second data.

When implementing the embodiments of the present disclosure, in order to further realize the function of the defect analysis model, the embodiment may use a fitting model for defect data analysis. That is, it may perform an analysis by a method for presetting a contribution degree of each production parameter in each production device to a certain defect. Firstly, the difference between the defect data and the first data may be obtained, because the first data is the central data of the fitting model, and The clear difference is needed to be used as differential data. The differential data may be analyzed through the contribution of different production parameters corresponding to the differential data.

For example, there is a 2 mm*3 mm burr in the defect detection of the shell of the gas meter, among them, 2 mm is the size of the burr in the X direction, and 3 mm is the size of the burr in the Y direction. At this time, the size of the burr on the X direction is generally contributed by the grinding device with 10% and contributed by the stamping device with 80%, which may be obtained by analyzing the contribution degree of the content of the analysis model. The parameters may be adjusted according to the contribution of different devices.

In a possible implementation, the defect analysis model may obtain the contribution degree of the production parameters of each production device in the differential data based on the second data when calculating the analysis data.

The defect analysis model may generate the analysis data by performing normalized superposition on the contribution degree corresponding to the same production parameters of the differential data.

When the embodiments of the present disclosure are implemented, different differential data may have the same corresponding parameters when the production parameters corresponding to different differential data may need to be adjusted. For example, in defect detection of the gas meter shell, there is a burr, and at the same time, the size at a certain direction has an error. At this time, the stamping device may contribute to both defects, so the contribution of the stamping device needs to be superimposed. Clarifying the adjusted production parameters corresponding to the stamping device may be conducive to the overall regulation of the production line.

In one possible implementation, the defect revising model may be configured with fourth data. The fourth data is a corresponding relationship between the analysis data and the revising range of the production parameters. When the general management platform inputs the analysis data into the defect revising model, the defect revising model may generate the revised production parameters based on the analysis data and the corresponding fourth data.

Figure 3:
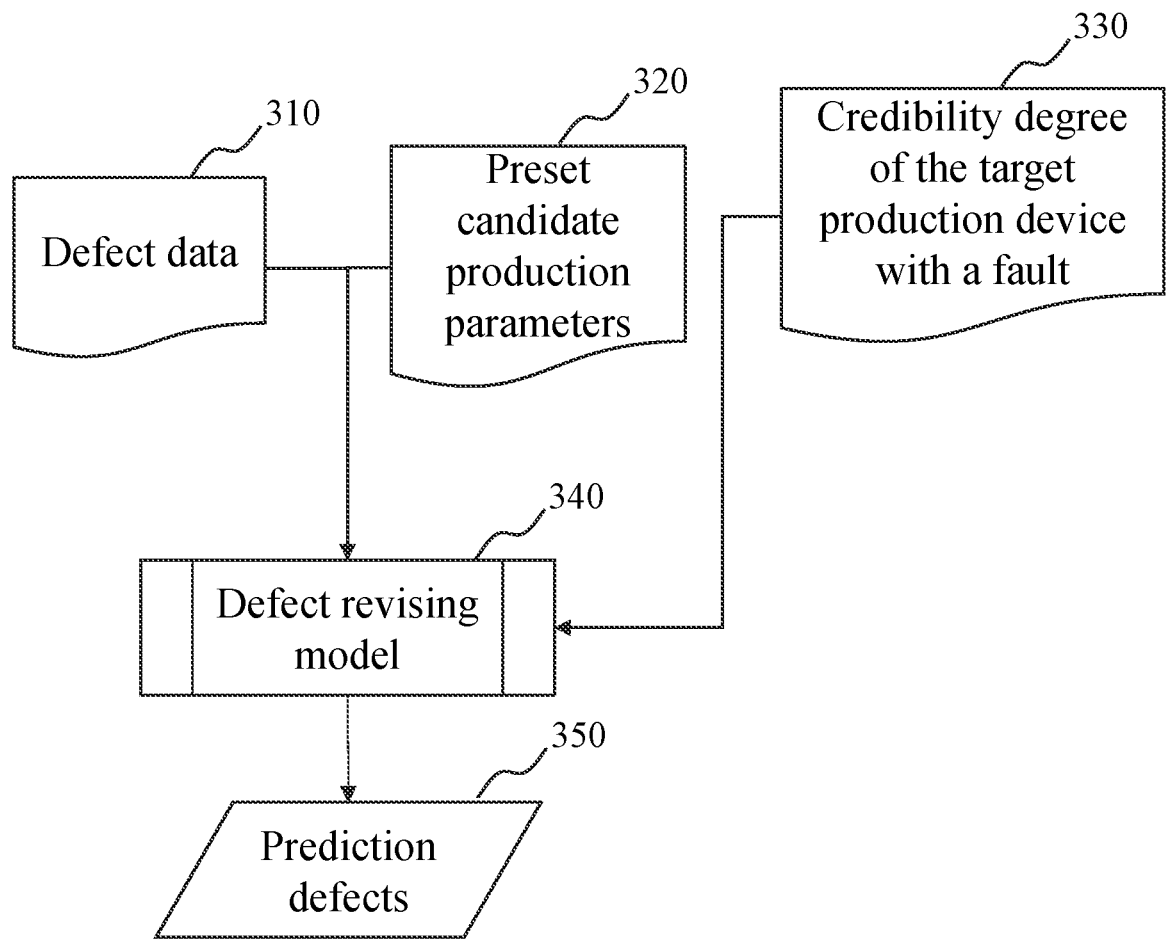
FIG. 3 is a schematic diagram illustrating an exemplary structure for the defect revising model according to some embodiments of the present disclosure.

For more embodiments of the defect revising model, see FIG. 3 and its related descriptions.

Figure 2:
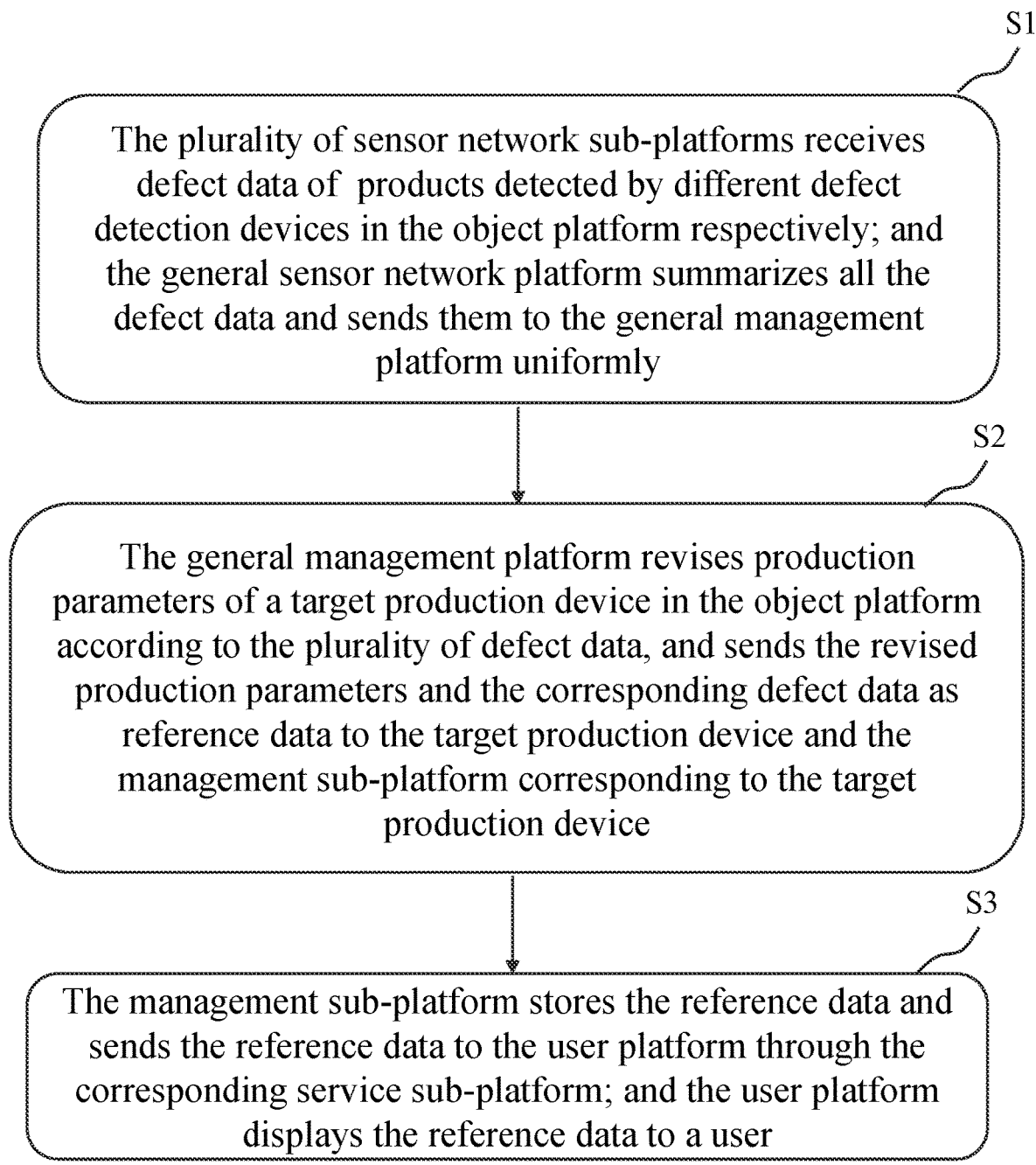
FIG. 2 is a flowchart illustrating an exemplary process for a control method for the intelligent manufacturing industrial Internet of Things based on distributed control according to some embodiments of the present disclosure.

FIG. 2 is a flowchart illustrating an exemplary process for a control method for the intelligent manufacturing industrial Internet of Things based on distributed control according to some embodiments of the present disclosure. The control method for the intelligent manufacturing industrial Internet of Things based on distributed control may be applied to the intelligent manufacturing industrial Internet of Things based on distributed control in FIG. 1. Further, the control method for the intelligent manufacturing industrial Internet of Things based on distributed control may include the content described in the following steps S1-step S3.

S1: the plurality of sensor network sub-platforms receives defect data of products detected by different defect detection devices in the object platform respectively; and the general sensor network platform summarizes all the defect data and sends them to the general management platform uniformly.

S2: the general management platform revises production parameters of a target production device in the object platform according to the plurality of defect data, and sends the revised production parameters and the corresponding defect data as reference data to the target production device and the management sub-platform corresponding to the target production device.

S3: the management sub-platform stores the reference data and sends the reference data to the user platform through the corresponding service sub-platform; and the user platform displays the reference data to a user.

In a possible implementation, the general management platform may be configured with a defect analysis model and a defect revising model. The general management platform may input the defect data into the defect analysis model and receive analysis data outputted by the defect analysis model. The general management platform may input the analysis data into the defect revising model and determine the revised production parameters based on data outputted by the defect revising model.

In one possible implementation, the defect analysis model may be configured with first data and second data. The first data is benchmark data corresponding to the defect data. The second data is a contribution degree of the production parameters of each production device corresponding to the defect data. When the general management platform inputs the defect data into the defect analysis model, the defect analysis model may generate differential data based on comparing the defect data and the corresponding first data and calculate the contribution degree of the production parameters of each production device of all the differential data as the analysis data based on the second data.

In a possible implementation, the defect analysis model may obtain the contribution degree of the production parameters of each production device of all the differential data based on the second data when calculating the analysis data. The defect analysis model may generate the analysis data by performing normalized superposition on the contribution degree corresponding to the same production parameters of the differential data.

In one possible implementation, the defect revising model may be configured with fourth data. The fourth data is a corresponding relationship between the analysis data and the revising range of the production parameters. When the general management platform inputs the analysis data into the defect revising model, the defect revising model may generate the revised production parameters based on the analysis data and the corresponding fourth data.

FIG. 3 is a schematic diagram illustrating an exemplary structure for the defect revising model according to some embodiments of the present disclosure. As shown in FIG. 3, the execution process 300 of defect revising model 340 includes the following content.

In some embodiments, the defect revising model 340 may be used to determine the prediction defects corresponding to the candidate parameters. In some embodiments, the defect revising model may be a neural network model, for example, a deep neural network model, other custom model structures, or the like, or any combination thereof. In some embodiments, the defect revising model may also be other models that may determine prediction defects based on candidate parameters and may be determined according to the actual needs specifically.

In some embodiments, the input of the defect revising model 340 may include the defect data 310, the preset candidate production parameters 320 corresponding to each target production device, and the output may include prediction defects 350 corresponding to the candidate production parameters. The target production device may be a device with a possible fault on the continuous production line.

In some embodiments, the defect data 310 may refer to the fault data of the production device on the production line. For example, defect data 310 may include but not limited to that: the concentration of disinfection solution is insufficient, the sterilization temperature is too low, and/or the cooling rate is too low, etc. The specific defect data may be determined by actual data production conditions.

In some embodiments, the preset candidate production parameters 320 may refer to the production-related data preset by the target production device. For example, preset candidate production parameters 320 may include the concentration of disinfection solution, sterilization temperature, cooling rate, or the like, or any combination thereof. In some embodiments, the preset candidate production parameters may be determined according to actual production experience.

In some embodiments, the input of the defect revising model may also include a credibility degree 330 of the target production device with a fault.

In some embodiments, the credibility degree 330 of the target production device with a fault may refer to the probability that the target production device is faulty. The higher the credibility degree, the higher the probability. The target production device usually refers to a production device that may occur with a fault.

In some embodiments, for a certain target production device, the difference value of the parameters corresponding to the different preset production parameters 320 is related to the credibility degree 330 of the target production device with a fault. The lower the credibility degree, the smaller the difference value. In some embodiments, when the credibility degree 330 of the target production device with a fault is lower than a preset threshold, the revising range of the production parameters may be appropriately reduced. Because if the credibility degree of the target production device with a fault is lower than the preset threshold, there may be no fault. The revising range may be determined based on actual production experience or production standards.

In some embodiments, the defect revising model may use training samples with labels to train an initial defect revising model. The training samples may include sample defect data and preset sample candidate production parameters corresponding to each target production device. The training labels may include prediction defects corresponding to the sample candidate production parameters. The training samples and the labels may be obtained based on artificial collection data. Multiple groups of training samples with labels may be input into the initial defect revising model, and a loss function may be constructed based on the output of the initial defect revising model and the corresponding label. Based on the loss function to update the parameters of the initial defect revising model iteratively, until the preset conditions are met, the training is over, and the trained defect revising model is obtained. The preset conditions may include that the loss function is less than the threshold, the loss function is convergence, the count of the iteration reaches a threshold, or the like, or any combination thereof.

In some embodiments, the general management platform may determine the revised production parameters based on the prediction defects corresponding to the candidate production parameters outputted by the defect revising model. For example, the general management platform may use candidate production parameters corresponding to prediction defects that meet a preset condition as the revised production parameters. The preset condition may be that the prediction defects meet the relevant production standards.

In some embodiments of the present disclosure, by using the trained defect revising model, the prediction defects corresponding to the candidate production parameters may be obtained at high efficiency, so that the general management platform may determine the candidate production parameters when the prediction defects meet the preset condition as the revised production parameters, which can implement the real-time adjustment and ensure the quality of production.

Figure 4:
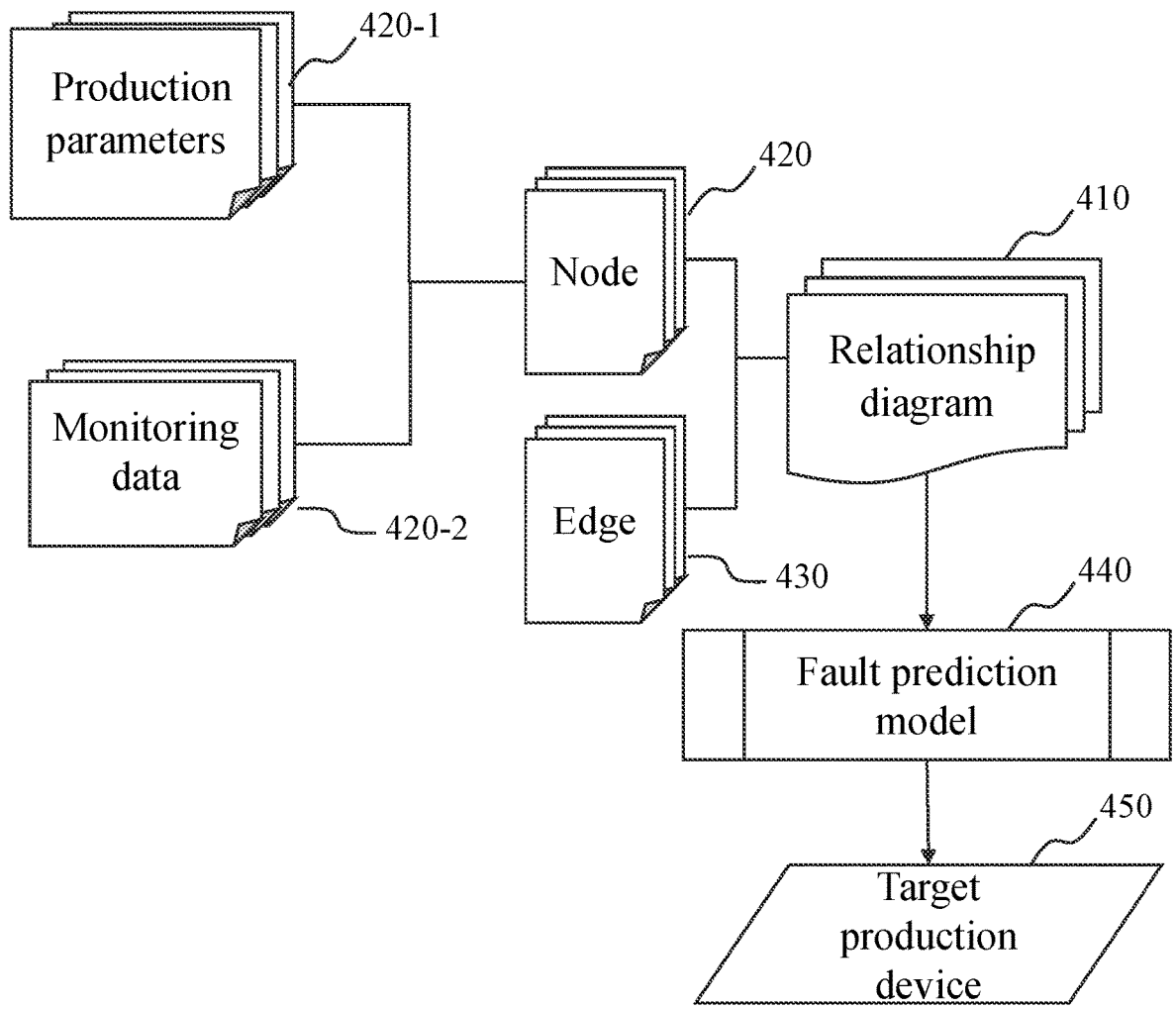
FIG. 4 is a schematic diagram illustrating a method for determining the target production device according to some embodiments of the present disclosure.

FIG. 4 is a schematic diagram illustrating a method for determining the target production device according to some embodiments of the present disclosure. As shown in FIG. 4, process 400 of determining the target production device includes at least the following content.

In some embodiments, the above target production device may come from a continuous production line, and the continuous production line may be a mixed filling production line.

In some embodiments, the general management platform may determine a relationship diagram 410 based on the production process of the continuous production line (such as the mixed filling production line) and a device corresponding to each production process. The relationship diagram 410 may be used to determine the target production device 450.

In some embodiments, the relationship diagram 410 may be used to indicate the relationship between the devices corresponding to the production processes of the mixed filling production line, which usually includes node 420 and edge 430. The node of the relationship diagram may correspond to each device on the mixed filling production line, and the edges may be the relationship between the devices.

In some embodiments, node 420 of the relationship diagram 410 may include a disinfection device node, a peeling and cleaning device node, a segmentation device node, a filling device node, a sterilization device node, a cooling device node, etc., which respectively correspond to a disinfection device, a peeling and cleaning device, a segmentation device, a filling device, a sterilization device, and a cooling device, etc.

The disinfection device may be used to disinfect raw materials. The peeling and cleaning device may be used to clean and/or peel the raw materials. The segmentation device may be used to segment the raw materials, including a cutting knife, etc. The filling device may be used to fill the raw materials. The sterilization device may be used to disinfect the filling product. The cooling device may be used for cooling the filling product after sterilization.

In some embodiments, the features of the node in the relationship diagram may include the production parameters 420-1 of each device of the mixed filling production line and/or the monitoring data 420-2 of each device.

In some embodiments, the production parameters may include data related to the working parameters of each device on the production line during production. For example, the production parameters may include the number of disinfection liquids of the disinfection device and/or disinfection temperature, the knife speed and/or the flow rate of cleaning liquid of the peeling and cleaning device, the segmentation rate of the segmentation device, and the working parameters of the filling device (such as filling pressure, filling rate, filling flow, etc.), the real-time temperature and/or temperature maintenance time of the sterilization device, the temperature decrease rate of the cooling device, etc.

In some embodiments, the monitoring data may include data of each device on the production line during production which is monitored by a monitoring device. For example, the monitoring data may include the concentration of disinfection liquids, the weight of the raw materials, the height of the liquid surface after filling, the sterilization temperature, etc.

In some embodiments, edge 430 of the relationship diagram 410 may be a directed edge. For example, the direction of the directed edge may include pointing the disinfection device node to the peeling and cleaning device node, pointing the peeling and cleaning device node to the segmentation device node, pointing the segmentation device node to the filling device node, pointing the filling device node to the sterilization device node, and pointing the sterilization device node to the cooling device node, etc.

In some embodiments, the above-mentioned diagram may be processed by the fault prediction model 440 to determine the target production device. For more explanations of the fault prediction model 440, see FIG. 5 and its related descriptions.

In some embodiments of the present disclosure, by constructing the relationship diagram between the devices (that is, the production device) corresponding to each production process of the mixed filling production line, the interconnection between each device may be better determined, which is conducive to determining the impact of different production processes on the next process. By inputting the relationship diagram into the fault prediction model, the target production device can be determined more accurately.

Figure 5:
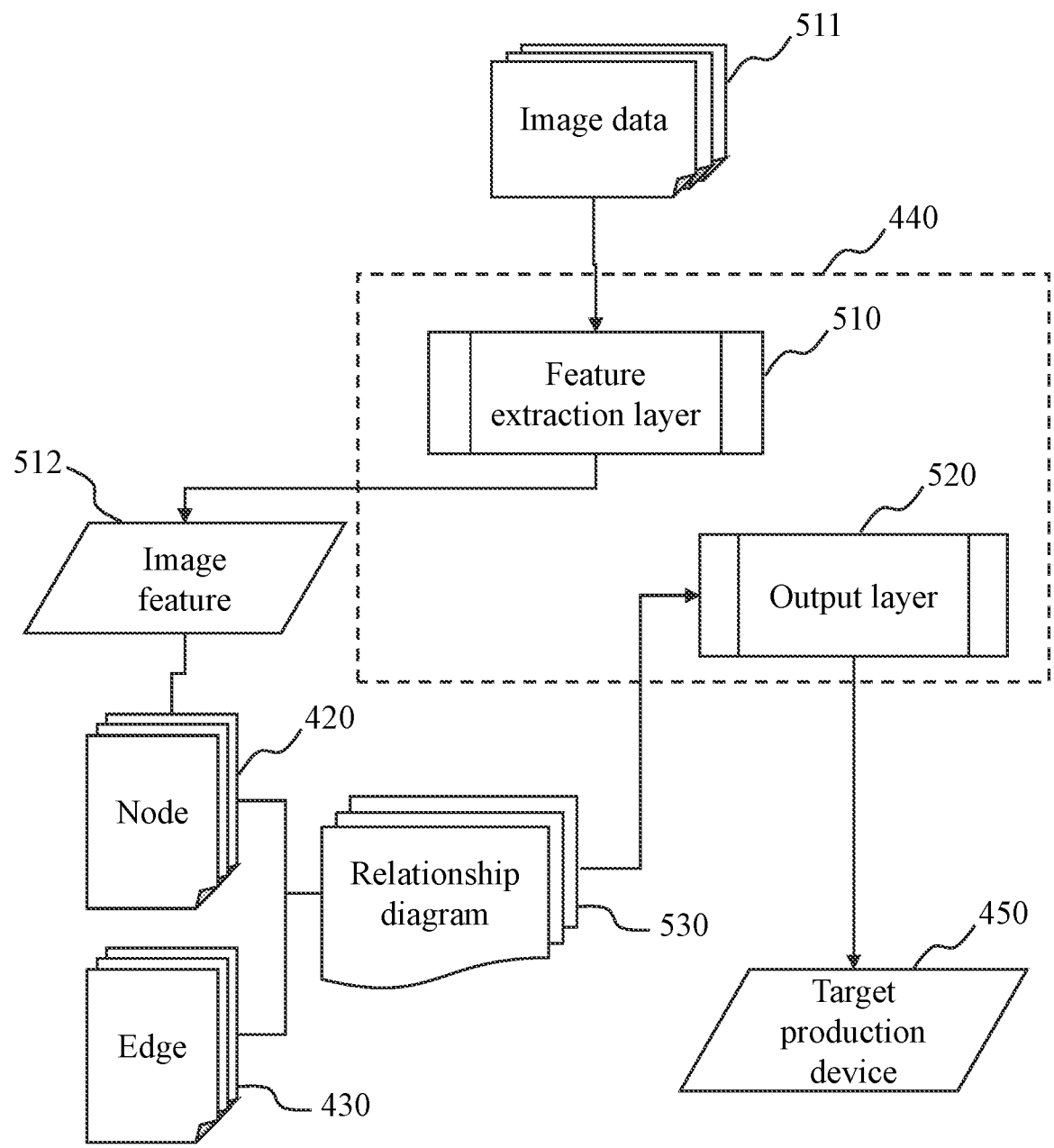
FIG. 5 is a schematic diagram illustrating an exemplary structure for a fault prediction model according to some embodiments of the present disclosure.

FIG. 5 is a schematic diagram illustrating an exemplary structure for a fault prediction model according to some embodiments of the present disclosure. As shown in FIG. 5, the execution process of the fault prediction model 500 includes at least the following content.

In some embodiments, the fault prediction model may be used to determine the target production device. In some embodiments, the fault prediction model may include one or more of a graph neural network model, a graph convolutional network model.

In some embodiments, the input of the fault prediction model may include a relationship diagram containing at least one node and at least one edge, and its output may include a target production device.

In some embodiments, the fault prediction model may include a feature extraction layer 510 and an output layer 520.

The feature extraction layer 510 may process the images of each node in the above-mentioned diagram to obtain the image feature. In some embodiments, the input of the feature extraction layer may include image data 511 of each node, and the output may include image feature 512 of each node. The image data may include the running image of each node device obtained by the monitoring device. For example, the image data may include pictures and/or videos. The image feature may include running data of each node device obtained from the image data. For example, the image feature may include the size of the raw materials, the temperature of the filling product, and/or the height of the liquid surface after filling.

In some embodiments, the output of the feature extraction layer 510 may also include semi-finished product features. The semi-finished features may include whether the semi-finished products on the mixed filling production line have impurities such as peel, fruit nucleus, stalks, leaves, etc., and the frequency of the above impurities occurring.

In some embodiments, the feature extraction layer 510 may be shared by all nodes or corresponding to each node.

In some embodiments, the general management platform may take the obtained image feature as one of the features of the node of the relationship diagram, thereby updating the features of the node in the relationship diagram.

The output layer 520 may process the relationship diagram FIG. 530 which has uploaded the node features to determine the target production device. In some embodiments, the input of the output layer 520 may include the relationship diagram FIG. 530, and the output may include target production device 450.

In some embodiments, the fault prediction model may be obtained through the joint training of the feature extraction layer and the output layer.

In some embodiments, training samples may include at least historical image data and a historical relationship diagram. The training labels may be historical target production devices. In some embodiments, sample data and the labels may be obtained through historical production data.

In some embodiments, the historical image data may be input into the feature extraction layer of the initial fault prediction model to obtain a historical image feature, and the historical image feature may be used as one of the features of the node to update the historical relationship diagram. The updated historical relationship diagram may be input into the output layer of the initial fault prediction model to obtain the output result. A loss function may be constructed based on the output result and the training labels. Based on the iteration of the loss function to update the parameters of the feature extract layer and output layer at the same time, until the preset conditions are met, the model training is over. The preset conditions may be that the loss function is convergence, the count of the iteration reaches a threshold, or the like. After the training completed, the parameters of the feature extraction layer and the output layer may be determined.

In some embodiments of the present disclosure, through using the trained fault prediction model, the target production device can be determined quickly and accurately, thereby the production parameters can be adjusted timely to improve the efficiency and quality of the production.

In some embodiments, a non-temporary computer-readable medium including at least one set of instructions may be used. When executed by one or more processors of a computing device, the at least one set of instructions may direct the computing device to perform the control method for an intelligent manufacturing industrial Internet of Things based on distributed control.

The basic concepts have been described above, apparently, for those skilled in the art, the above-mentioned detailed disclosure is only used as an example, and it does not constitute a limitation of the present disclosure. Although there is no clear explanation here, those skilled in the art may make various modifications, improvements, and corrections for the present disclosure. Such modifications, improvements, and corrections are suggested in the present disclosure, so such modifications, improvements, and corrections still belong to the spirit and scope of the exemplary embodiments of the present disclosure.

Meanwhile, the present disclosure uses specific words to describe the embodiments of the present disclosure. For example, "one embodiment," "an embodiment," and/or "some embodiments" mean that a certain feature, structure, or feature is connected with at least one embodiment of the present disclosure. Therefore, it should be emphasized and noted that two or more references of "an embodiment" or "one embodiment" or "an alternative embodiment" in various places in the present disclosure do not necessarily refer to the same embodiment. In addition, some features, structures, or features of one or more embodiments in this manual may be properly combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose of description and that the appended claims are not limited to the disclosed embodiments, on the contrary, are intended to cover modifications and equivalent combinations that are within the spirit and scope of the embodiments of the present disclosure. For example, although the implementation of various components described above may be embodied in a hardware device, it may also be implemented as a software only solution, e.g., an installation on an existing server or mobile device.

Similarly, it should be noted that to simplify the expressions disclosed in the present disclosure and thus help the understanding of one or more embodiments of the invention, in the foregoing description of the embodiments of this specification, various features may sometimes be combined into one embodiment, drawings or descriptions thereof. However, this disclosure method does not mean that the features required by the object of the present disclosure are more than the features mentioned in the claims. Rather, claimed subject matter may lie in less than all features of a single foregoing disclosed embodiment.

Some embodiments use numbers with description ingredients and attributes. It should be understood that the number described by such examples is used in some examples with the modified words "about", "approximate" or "generally" to modify. Unless otherwise stated, "about", "approximate" or "generally" indicates that the number allows a change of ±20%. Correspondingly, in some embodiments, the value parameters used in the present disclosure and claims are approximate values. The approximate values may be changed according to the features of individual embodiments. In some embodiments, the numerical parameters should consider the effective digits specified and use a general digit reservation method. Although in some embodiments of the present disclosure, the numerical domain and parameters used to confirm the range of its scope are approximate values, the setting of such values may be as precise as possible within the feasible range in specific embodiments.

For each patent, patent application, patent application publications and other materials cited by the present disclosure, such as articles, books, instructions, publications, documents, etc., all of them will be incorporated in the present disclosure as a reference. History application documents that are inconsistent or conflictive with the contents of the present disclosure are excluded, as well as documents (currently or subsequently appended to the present disclosure) limiting the broadest scope of the claims of the present specification. It should be noted that, if there is any inconsistency or conflict between the descriptions, definitions, and/or usage of terms in subsidiary information of the present disclosure and the contents of the present disclosure, the descriptions, definitions, and/or usage of terms in the present disclosure shall prevail.

Finally, it should be understood that the embodiments described in the present disclosure are only used to illustrate the principle of the embodiments of the present disclosure. Other deformations are also possible within the scope of the present disclosure. Therefore, merely by way of example and not limitation, alternative configurations of the embodiments of the present disclosure may be considered consistent with the teachings of the present disclosure. Correspondingly, the embodiments of the present disclosure are not limited to the implementation and description of the present disclosure.

What is claimed is:

1. An industrial Internet of Things for intelligent control of filling production, comprising a user platform, a service platform, a management platform, a sensor network platform, and an object platform interacting in sequence, wherein
the service platform is provided with a plurality of independent service sub-platforms; the management platform is provided with a general management platform and a plurality of independent management sub-platforms, the management sub-platforms interacting with the general management platform, and the management sub-platforms interacting with corresponding service sub-platforms; the sensor network platform is provided with a general sensor network platform and a plurality of independent sensor network sub-platforms, the sensor network sub-platforms interacting with the general sensor network platform; wherein
the plurality of sensor network sub-platforms are configured to:
receive defect data of products detected by different defect detection devices in the object platform;
the general sensor network platform is configured to:
summarize all the defect data and send the defect data to the general management platform uniformly;
the general management platform is configured to:
revise production parameters of a target production device in the object platform according to the plurality of defect data, and send the revised production parameters and the corresponding defect data as reference data to the target production device and the management sub-platform corresponding to the target production device, wherein the target production device comes from a continuous production line, the continuous production line is a mixed filling production line, and determining the target production device includes:
determining a relationship diagram based on a production process of the mixed filling production line and devices related to the production process, wherein the relationship diagram indicates a relationship between the devices corresponding to the production processes of the mixed filling production line;
determining the target production device by processing the relationship diagram based on a fault prediction model, the fault prediction model including a graph neural network model;
store the reference data and send the reference data to the user platform through the corresponding service sub-platform; and
the user platform is configured to display the reference data to a user.

2. The industrial Internet of Things for intelligent control of filling production of claim 1, wherein the general management platform is configured with a defect analysis model and a defect revising model; and
the general management platform is configured to:
input the defect data into the defect analysis model and receive analysis data outputted by the defect analysis model; and
input the analysis data into the defect revising model, and determine the revised production parameters based on data outputted by the defect revising model.

3. The industrial Internet of Things for intelligent control of filling production of claim 2, wherein the defect revising model is a neural network model, an input of the defect revising model includes the defect data, preset candidate production parameters corresponding to each target production device, and an output of the defect revising model includes prediction defects corresponding to the candidate production parameters; and
the general management platform is configured to determine candidate production parameters that the prediction defects meet preset conditions as the revised production parameters.

4. The industrial Internet of Things for intelligent control of filling production of claim 1, wherein the relationship diagram includes at least one node and at least one edge, the devices include a disinfection device, a peeling and cleaning device, a segmentation device, a filling device, a sterilization device, and a cooling device; wherein
at least one node of the relationship diagram corresponds to the devices related to the production process, respectively, and the at least one node includes a disinfection device node, a peeling and cleaning device node, a segmentation device node, a filling device node, a sterilization device node, and a cooling device node;
the at least one edge of the relationship diagram is a directed edge, the direction of the directed edge includes pointing the disinfection device node to the peeling and cleaning device node, pointing the peeling and cleaning device node to the segmentation device node, pointing the segmentation device node to the filling device node, pointing the filling device node to the sterilization device node, and pointing the sterilization device node to the cooling device node.

5. The industrial Internet for intelligent control of filling production of claim 4, wherein features of the at least one node include the production parameters or monitoring data of each device.

6. The industrial Internet of Things for intelligent control of filling production of claim 4, wherein the fault prediction model includes a feature extraction layer, the feature extraction layer is used to process image data of each node to obtain an image feature, and the image data is obtained by an image acquisition device; and
the general management platform is configured to determine the image feature as one of the features of the node.

7. The industrial Internet of Things for intelligent control of filling production of claim 2, wherein the defect analysis model is configured with first data and second data; the first data is benchmark data corresponding to the defect data; the second data is a contribution degree of the production parameters of each production device corresponding to the defect data; and the general management platform is configured that:
when the defect data is input into the defect analysis model, the defect analysis model generates differential data by comparing the defect data and the corresponding first data and calculates the contribution degree of the production parameters of each production device of all the differential data as the analysis data based on the second data.

8. The industrial Internet of Things for intelligent control of filling production of claim 7, wherein the defect analysis model obtains the contribution degree of the production parameters of each production device of all the differential data based on the second data when calculating the analysis data; and the defect analysis model generates the analysis data by performing normalized superposition on the contribution degree corresponding to the same production parameters of the differential data.

9. The industrial Internet of Things for intelligent control of filling production of claim 2, wherein the defect revising model is configured with fourth data; the fourth data is a corresponding relationship between the analysis data and the revising range of the production parameters; and the general management platform is configured that:
when the analysis data is input into the defect revising model, the defect revising model generates the revised production parameters based on the analysis data and the corresponding fourth data.

10. A control method for an industrial Internet of Things for intelligent control of filling production, which is applied to a user platform, a service platform, a management platform, a sensor network platform, and an object platform interacting in sequence, wherein the service platform is provided with a plurality of independent service sub-platforms; the management platform is provided with a general management platform and a plurality of independent management sub-platforms, the management sub-platforms interacting with the general management platform, and the management sub-platforms interacting with corresponding service sub-platforms; the sensor network platform is provided with a general sensor network platform and a plurality of independent sensor network sub-platforms, the sensor network sub-platforms interacting with the general sensor network platform; and the control method comprises:
receiving, by the plurality of sensor network sub-platforms, defect data of products detected by different defect detection devices in the object platform respectively; summarizing all the defect data and sending the defect data to the general management platform uniformly by the general sensor network platform;

revising production parameters of a target production device in the object platform according to the plurality of defect data, and sending the revised production parameters and the corresponding defect data as reference data to the target production device and the management sub-platform corresponding to the target production device by the general management platform, wherein the target production device comes from a continuous production line, the continuous production line is a mixed filling production line, and determining the target production device includes:

determining a relationship diagram based on a production process of the mixed filling production line and devices related to the production process, wherein the relationship diagram indicates a relationship between the devices corresponding to the production processes of the mixed filling production line;

determining the target production device by processing the relationship diagram based on a fault prediction model, the fault prediction model including a graph neural network model;

storing the reference data and sending the reference data to the user platform through the corresponding service sub-platform by the management sub-platform; and displaying the reference data to a user by the user platform.

11. The control method for an industrial Internet of Things for intelligent control of filling production of claim 10, wherein the general management platform is configured with a defect analysis model and a defect revising model;

the general management platform inputs the defect data into the defect analysis model and receives analysis data outputted by the defect analysis model; and the general management platform inputs the analysis data into the defect revising model and determines the revised production parameters based on data outputted by the defect revising model.

12. The control method for an industrial Internet of Things for intelligent control of filling production of claim 11, wherein the defect revising model is a neural network model, an input of the defect revising model includes the defect data, preset candidate production parameters corresponding to each target production device, and an output of the defect revising model includes prediction defects corresponding to the candidate production parameters; and the general management platform is configured to determine candidate production parameters that the prediction defects meet preset conditions as the revised production parameters.

13. The control method for an industrial Internet of Things for intelligent control of filling production of claim 12, wherein the input of the defect revising model also includes a credibility degree of each target production device with a fault.

14. The control method for an industrial Internet of Things for intelligent control of filling production of claim 10, wherein the relationship diagram includes at least one node and at least one edge, the devices include a disinfection device, a peeling and cleaning device, a segmentation device, a filling device, a sterilization device, and a cooling device; wherein at least one node of the relationship diagram corresponds to the devices related to the production process, respectively, and the at least one node includes a disinfection device node, a peeling and cleaning device node, a segmentation device node, a filling device node, a sterilization device node, and a cooling device node;

the at least one edge of the relationship diagram is a directed edge, the direction of the directed edge includes pointing the disinfection device node to the peeling and cleaning device node, pointing the peeling and cleaning device node to the segmentation device node, pointing the segmentation device node to the filling device node, pointing the filling device node to the sterilization device node, and pointing the sterilization device node to the cooling device node.

15. The control method for an industrial Internet of Things for intelligent control of filling production of claim 14, wherein features of the at least one node include the production parameters or monitoring data of each device.

16. The control method for an industrial Internet of Things for intelligent control of filling production of claim 14, wherein the fault prediction model includes a feature extraction layer, the feature extraction layer is used to process image data of each node to obtain an image feature, and the image data is obtained by an image acquisition device; and the general management platform is configured to determine the image feature as one of the features of the node.

17. The control method for an industrial Internet of Things for intelligent control of filling production of claim 11, wherein the defect analysis model is configured with first data and second data; the first data is benchmark data corresponding to the defect data; the second data is a contribution degree of the production parameters of each production device corresponding to the defect data; and when the general management platform inputs the defect data into the defect analysis model, the defect analysis model generates differential data by comparing the defect data and the corresponding first data and calculates the contribution degree of the production parameters of each production device of all the differential data as the analysis data based on the second data.

18. The control method for an industrial Internet of Things for intelligent control of filling production of claim 17, wherein the defect analysis model obtains the contribution degree of the production parameters of each production device of all the differential data based on the second data when calculating the analysis data; and the defect analysis model generates the analysis data by performing normalized superposition on the contribution degree corresponding to the same production parameters of the differential data.

19. The control method for an industrial Internet of Things for intelligent control of filling production of claim 11, wherein the defect revising model is configured with fourth data; the fourth data is a corresponding relationship between the analysis data and the revising range of the production parameters; and when the general management platform inputs the analysis data into the defect revising model, the defect revising model generates the revised production parameters based on the analysis data and the corresponding fourth data.

20. A non-transitory computer-readable medium, comprising at least one set of instructions, wherein when executed by one or more processors of a computing device, the at least one set of instructions direct the computing device to perform the control method for an industrial Internet of Things for intelligent control of filling production according to claim 10.

* * * * *